(12) United States Patent
Fink (10) Patent No.: US 9,024,560 B2
(45) Date of Patent: May 5, 2015

(54) METHOD FOR ADJUSTING A DC VOLTAGE INTERMEDIATE-CIRCUIT VOLTAGE

(75) Inventor: Holger Fink, Stuttgart (DE)

(73) Assignee: Robert Bosch GmbH, Stuttgart, DE (US)

( * ) Notice: Subject to any disclaimer, the term of this patent is extended or adjusted under 35 U.S.C. 154(b) by 196 days.

(21) Appl. No.: 13/825,063

(22) PCT Filed: Aug. 10, 2011

(86) PCT No.: PCT/EP2011/063732
§ 371 (c)(1),
(2), (4) Date: Jul. 3, 2013

(87) PCT Pub. No.: WO2012/038149
PCT Pub. Date: Mar. 29, 2012

(65) Prior Publication Data
US 2013/0278190 A1    Oct. 24, 2013

(30) Foreign Application Priority Data

Sep. 20, 2010 (DE) .......................... 10 2010 041 046

(51) Int. Cl.
*H02P 6/08*    (2006.01)
*B60L 11/18*    (2006.01)
*H01M 10/44*    (2006.01)
(Continued)

(52) U.S. Cl.
CPC ............... *H02P 6/08* (2013.01); *B60L 11/1866* (2013.01); *H01M 10/441* (2013.01); *H01M 10/482* (2013.01); *H01M 16/00* (2013.01); *H02J 7/0013* (2013.01); *H02M 1/36* (2013.01); *Y02T 10/7005* (2013.01); *Y02T 10/7011* (2013.01); *Y02T10/7055* (2013.01); *Y02T 10/7061* (2013.01); *Y02T 10/92* (2013.01); *H02M 3/10* (2013.01)
(Continued)

(58) Field of Classification Search
CPC ........................................................ H02P 6/08

USPC ................................. 318/400.3, 400.01, 700
See application file for complete search history.

(56) References Cited

U.S. PATENT DOCUMENTS 5,159,272 A * 10/1992 Rao et al. ....................... 324/429
6,140,799 A    10/2000 Thomasson
(Continued)

FOREIGN PATENT DOCUMENTS

EP    2 061 116 A1    5/2009

OTHER PUBLICATIONS

International Search Report corresponding to PCT Application No. PCT/EP2011/063732, mailed Nov. 2, 2011 (German and English language document) (5 pages).

*Primary Examiner* — David S Luo
(74) *Attorney, Agent, or Firm* — Maginot, Moore & Beck LLP (57) ABSTRACT

A method is disclosed for adjusting a voltage of a DC-voltage intermediate circuit in a battery system having a battery and a drive system. The battery is configured to output one selectable output voltage from n+1 different output voltages. In a first step of the method, an actual value of the voltage of the DC-voltage intermediate circuit is determined, and is then compared with the various output voltages of the battery. A first selected output voltage of the battery, which is the highest voltage of those output voltages of the battery which are less than the actual value of the voltage of the DC-voltage intermediate circuit, and a second selected output voltage of the battery, which is the lowest voltage of those output voltages of the battery which are higher than the actual value of the voltage of the DC-voltage intermediate circuit, are then selected.

11 Claims, 6 Drawing Sheets

| | | | | | |
|---|---|---|---|---|---|
| (51) | Int. Cl. | | (56) | References Cited | |
| | *H01M 10/48* | (2006.01) | | U.S. PATENT DOCUMENTS | |
| | *H02J 7/00* | (2006.01) | | | |
| | *H02M 1/36* | (2007.01) | 2008/0054870 A1 | 3/2008 | Kosaka et al. |
| | *H02M 3/10* | (2006.01) | 2008/0197810 A1 | 8/2008 | Ishikawa et al. |
| | *H01M 16/00* | (2006.01) | * cited by examiner | | |

METHOD FOR ADJUSTING A DC VOLTAGE INTERMEDIATE-CIRCUIT VOLTAGE

This application is a 35 U.S.C. §371 National Stage Application of PCT/EP2011/063732, filed on Aug. 10, 2011, which claims the benefit of priority to Serial No. DE 10 2010 041 046.2 filed on Sept. 20, 2010 in Germany, the disclosures of which are incorporated herein by reference in their entirety.

The present disclosure relates to a method for adjusting a DC voltage intermediate circuit voltage and to a battery and a battery system having a DC voltage intermediate circuit that are embodied to perform the method.

BACKGROUND

It has become apparent that in future, both in the case of stationary applications and also in the case of vehicles such as hybrid vehicles and electric vehicles, battery systems will be used ever more frequently. In order to be able to meet particular requirements for a respective application voltage and the power that can be made available, a high number of battery cells are connected in series. Since it is necessary for the current that is provided by a battery of this type to flow through all the battery cells and a battery cell can only carry a limited amount of current, battery cells are in addition often connected in parallel in order to increase the maximum current. This can be achieved either by providing a plurality of battery cells within a battery cell housing or by connecting battery cells externally.

Figure 1:
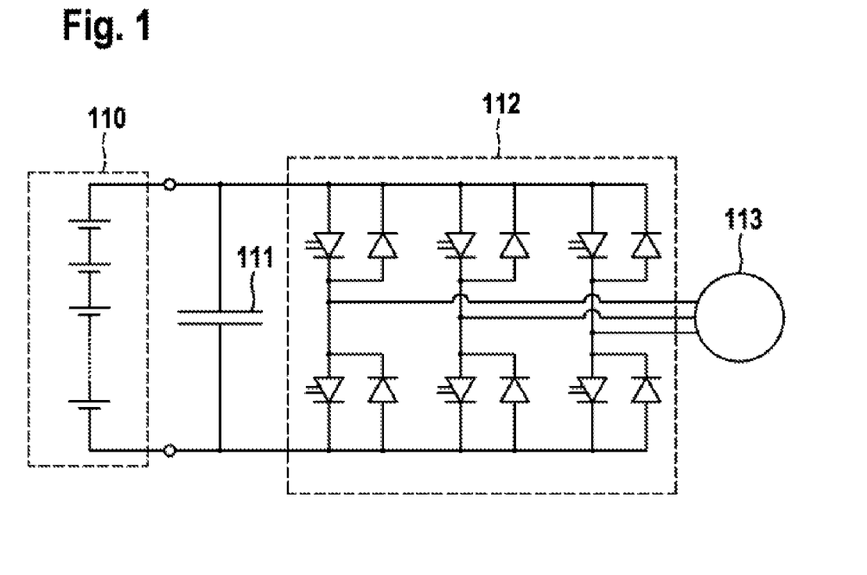
FIG. 1 shows an electric drive system in accordance with the prior art.

FIG. 1 illustrates the principal circuit diagram of a conventional electric drive system, such as is used for example in electric vehicles and hybrid vehicles or also in stationary applications such as when adjusting rotor blades of wind turbines. A battery 110 is connected to a DC voltage intermediate circuit and said DC voltage intermediate circuit is embodied by a capacitor 111. A pulse-controlled inverter 112 is connected to the DC voltage intermediate circuit and sinusoidal voltages that are phase-offset with respect to each other for operating an electric drive motor 113 are supplied by said pulse-controlled inverter 112 to three outputs by way of in each case two switchable semi-conductor gates and two diodes. The capacity of the capacitor 111 that forms the DC voltage intermediate circuit must be sufficiently large in order to stabilize the voltage in the DC voltage intermediate circuit for a period of time in which one of the switchable semi-conductor gates is switched to conduct. In a practical application, such as an electric vehicle, a high capacity in the mF range is achieved.

Figure 2:
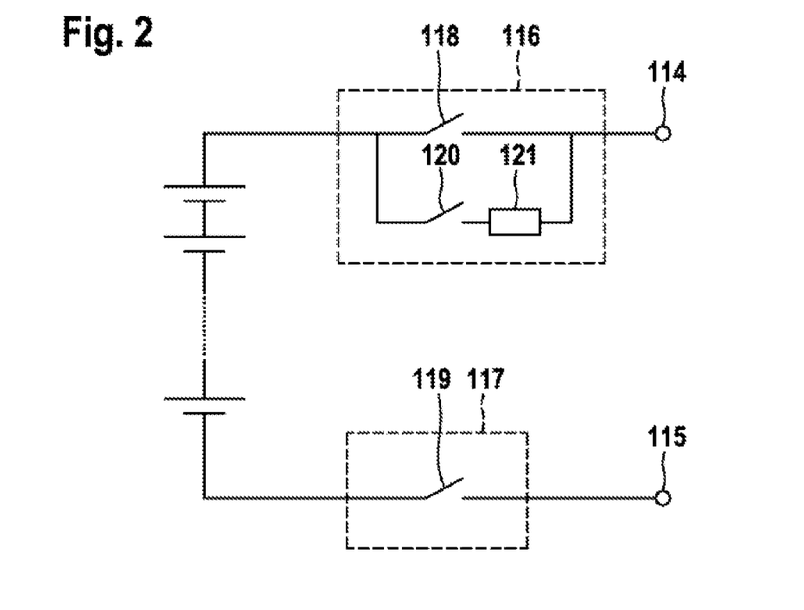
FIG. 2 shows a block diagram of a battery in accordance with the prior art.

FIG. 2 illustrates the battery 110 of FIG. 1 in a detailed block diagram. A plurality of battery cells is connected in series and optionally in addition in parallel in order to achieve a battery capacity and a high output voltage required for a respective application. A charging and disconnecting device 116 is connected between the positive pole of the battery cells and a positive battery terminal 114. Optionally, a disconnecting device 117 can in addition be connected between the negative pole of the battery cells and a negative battery terminal 115. The disconnecting and charging device 116 and the disconnecting device 117 comprise in each case a switch 118 or 119 respectively, which switches are provided for disconnecting the battery cells from the battery terminals in order to disconnect the battery terminals from the voltage supply. Otherwise, as a result of the high DC voltage of the battery cells that are connected in series, there is a considerable potential risk for maintenance personnel or the like. A charging switch 120 having a charging resistor 121 that is connected in series to the charging switch 120 is in addition provided in the charging and disconnecting device 116. The charging resistor 121 limits a charging current for the capacitor 111 if the battery is connected to the DC voltage intermediate circuit. For this purpose, the switch 118 is initially left open and only the charging switch 120 is closed. If the voltage at the positive battery terminal 114 achieves the voltage of the battery cells, the switch 119 can be closed and if necessary the charging switch 120 can be opened.

The charging switch 120 and the charging resistor 121 represent a significant amount of additional expenditure in applications in which the output is in the range of a few 10 kW and said additional expenditure is only required for the process that lasts a few hundred milliseconds for charging the DC voltage intermediate circuit. Said components are not only expensive but they are also large and heavy which is particularly troublesome when used in mobile applications such as electric motor vehicles.

SUMMARY

It is therefore proposed in accordance with the disclosure to provide a method for adjusting a voltage in a DC voltage intermediate circuit of a battery system having a battery and a drive system. The battery is connected to the drive system by way of the DC voltage intermediate circuit and comprises a number of n series-connected battery modules, each of which battery modules comprises a coupling unit and at least one battery cell that is connected between a first input and a second input of the coupling unit. The battery modules are embodied to provide either a battery module voltage or a voltage of zero in dependence upon a switching state of the coupling unit. The number n is greater than 1. The battery is embodied to provide an output voltage that can be selected from n+1 different output voltages. The method comprises at least the following steps:

a) Determine an instantaneous value of the voltage of the DC voltage intermediate circuit;
b) Compare the instantaneous value of the voltage of the DC voltage intermediate circuit with the different output voltages of the battery;
c) Select a first selected output voltage of the battery that is the highest voltage of those output voltages of the battery that are lower than the instantaneous value of the voltage of the DC voltage intermediate circuit;
d) Select a second selected output voltage of the battery that is the lowest voltage of those output voltages of the battery that are higher than the instantaneous value of the voltage of the DC voltage intermediate circuit;
e) During a first variable period of time provide the first selected output voltage of the battery;
f) During a second variable period of time provide the second selected output voltage of the battery; and
g) Repeat the steps a) to f) until the voltage of the DC voltage intermediate circuit achieves a desired operating voltage.

The method of the disclosure provides the advantage that the output voltage of the battery is switched rapidly and in a controlled manner between the first and the second selected output voltage, as a consequence of which a time-averaged adjustable charging current for the DC voltage intermediate circuit is provided. Since the charging current is adjusted to a desired value by selecting suitable first and second variable periods of time and consequently said charging current can also be limited, the charging switch 120 and the charging resistor 121 of the battery systems of the prior art can be omitted as a result of which costs, volume and weight of a battery system that functions according to the method in accordance with the disclosure can be correspondingly reduced. As the battery is embodied to provide different output voltages by activating or deactivating the individual series-connected battery modules, it is possible in order to adjust the voltage of the DC voltage intermediate circuit to select the two output voltages of the battery that are the closest in value to the instantaneous value of the voltage and to switch between said two output voltages with the appropriate first and second variable periods of time in order to influence the voltage of the DC voltage intermediate circuit as desired. As a result of selecting the two closest output voltages of the battery, the ripple content of the charging current is reduced to a minimum which owing to the inevitably present inductances and capacities can only occur at a limited rate of change of the output voltage of the battery. The switching speed of the coupling units of the battery modules can also be reduced accordingly.

The method of the disclosure has in addition the advantage that the DC voltage intermediate circuit can be charged in a shorter period of time. In a battery system having the battery that is illustrated in FIG. 2 and that comprises a charging and disconnecting device 116, the DC voltage intermediate circuit is charged with a characteristic that corresponds to an exponential function with negative exponents until the switch 118 closes. This means that the maximum charging current flows at the commencement of the charging process so that the voltage of the DC voltage intermediate circuit approaches the value of the output voltage of the battery in an asymptotic manner; said maximum charging current does, however, continue to reduce as the process of charging the DC voltage intermediate circuit proceeds. However, the voltage of the DC voltage intermediate circuit can increase in a linear manner in accordance with the method of the disclosure and thus the capacity of the DC voltage intermediate circuit can be charged during the entire charging period of time to an averaged constant current that is at least a similar value to that of the initial charging current in a battery system having a charging resistor 121. As a consequence, the first desired operating voltage is achieved correspondingly more rapidly.

It is preferred that the desired operating voltage is equal to a maximum of the n+1 different output voltages of the battery. The method is performed in this case until the DC voltage intermediate circuit has achieved the maximum possible voltage. The control system is subsequently deactivated so that the voltage of the DC voltage intermediate circuit is directly coupled to the output voltage of the battery.

The step of determining the instantaneous value of the voltage of the DC voltage intermediate circuit preferably comprises a step of measuring the voltage of the DC voltage intermediate circuit. As a consequence, it is possible to implement not only control methods but also closed loop control methods in which the closed loop control is performed in dependence upon measured values of the target measured variable, in other words the voltage of the DC voltage intermediate circuit. Alternatively, the instantaneous value of the voltage of the DC voltage intermediate circuit can be calculated by way of a state variable.

It is particularly preferred that the first variable period of time and the second variable period of time are determined in dependence upon a difference between the desired operating voltage and the instantaneous value of the voltage of the DC voltage intermediate circuit. The (average) current that is set during the second variable period of time is in addition to the ratio of the first variable period of time with respect to the second variable period of time also dependent upon the difference between the instantaneous value of the voltage of the DC voltage intermediate circuit and the desired operating voltage (usually equal to the maximum output voltage of the battery). In order, for example, to set a charging current for a given pair of a first and a second selected output voltage of the battery, which charging current is on average constant during the process of charging the DC voltage intermediate circuit, the first variable period of time is reduced in comparison to the second variable period of time the smaller the difference. Alternatively or additionally, the second variable period of time can also be extended in comparison to the first variable period of time.

The method can comprise an additional step of measuring a prevailing charging current. As a consequence thereof, a closed loop control method that is being used can also take into consideration the prevailing charging current or it can implement safety mechanisms to provide protection from inadmissibly high charging currents.

It is particularly preferred that the method therefore also comprises an additional step of comparing the measured prevailing charging current with a maximum permissible charging current, wherein the steps e) and/or f) is terminated if the prevailing charging current is greater than the maximum permissible charging current.

Following on from the two latter mentioned variants, the method can also include an additional step of determining an average charging current and of comparing the average charging current with a desired charging current, wherein the first variable period of time is extended and/or the second variable period of time is reduced if the average charging current is greater than the desired charging current, and/or wherein the first variable period of time is reduced and/or the second variable period of time is increased if the average charging current is lower than the desired charging current.

It is particularly preferred that a desired charging current is maintained at a constant value until the voltage of the DC voltage intermediate circuit achieves the desired operating voltage. In this manner, the voltage of the DC voltage intermediate circuit increases in a linear manner and the DC voltage circuit is charged in a shortest possible time without exceeding a maximum permissible charging current.

A second aspect of the disclosure provides a battery having a control unit and a number of n series-connected battery modules. Each battery module comprises a coupling unit and at least one battery cell that is connected between a first input and a second input of the coupling unit. The battery modules are embodied to provide in dependence upon a switching state of the coupling unit either a battery module voltage or a voltage of zero. The number n of the series-connected battery modules is greater than 1 so that the battery is embodied to provide a selectable output voltage of n+1 different output voltages. The control unit is embodied in accordance with the disclosure for the purpose of performing the method of the first disclosed aspect.

It is particularly preferred in this case that the battery cells of the battery modules are lithium-ion battery cells. Lithium-ion battery cells have the advantages of a high cell voltage and high energy content in a given volume.

A further disclosed aspect relates to a battery system having a battery, a DC voltage intermediate circuit that is connected to the battery, and a drive system that is connected to the DC voltage intermediate circuit. In this case, the battery is embodied in accordance with the aforementioned aspect of the disclosure.

It is particularly preferred that the DC voltage intermediate circuit is in this case connected directly to the battery, in other words no further components are connected between the battery and the DC voltage intermediate circuit, in particular no charging device and accordingly no charging switch and no charging resistor. In the case of embodiments of the battery system, however, it is also possible to connect further components such as current sensors between the battery and the DC voltage intermediate circuit.

The DC voltage intermediate circuit can comprise a capacitor or can be embodied as a capacitor.

The battery system can, for example, be implemented in a motor vehicle, wherein the drive system comprises an electric drive motor for driving the motor vehicle and a pulse-controlled inverter.

BRIEF DESCRIPTION OF THE DRAWINGS

Exemplary embodiments of the disclosure are explained detail with reference to the drawings and the description hereinunder, wherein like reference numbers describe like components or components that function in a like manner. In the drawings.

DETAILED DESCRIPTION

Figure 3:
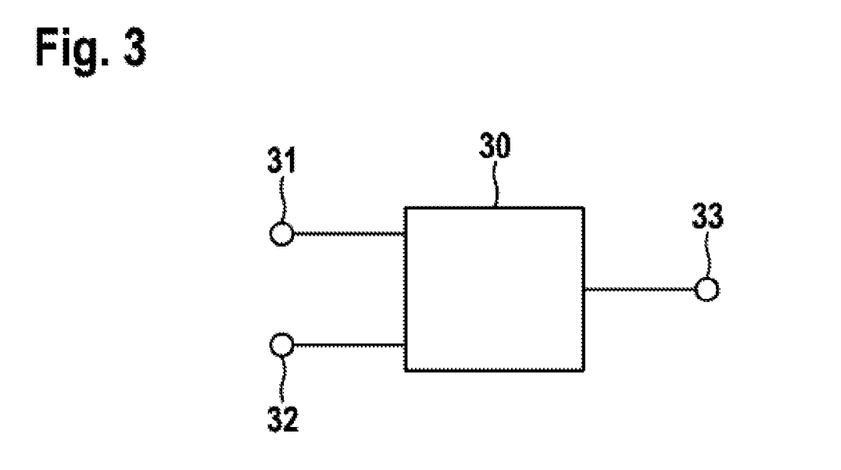
FIG. 3 shows a first embodiment of a coupling unit for use in a battery, with which the method in accordance with the disclosure can be performed.

FIG. 3 illustrates a first embodiment of a coupling unit 30 for use in a battery with which the method in accordance with the disclosure can be performed. The coupling unit 30 comprises two inputs 31 and 32 and also an output 33 and is embodied to connect one of the inputs 31 or 32 to the output 33 and to disconnect the other one.

Figure 4:
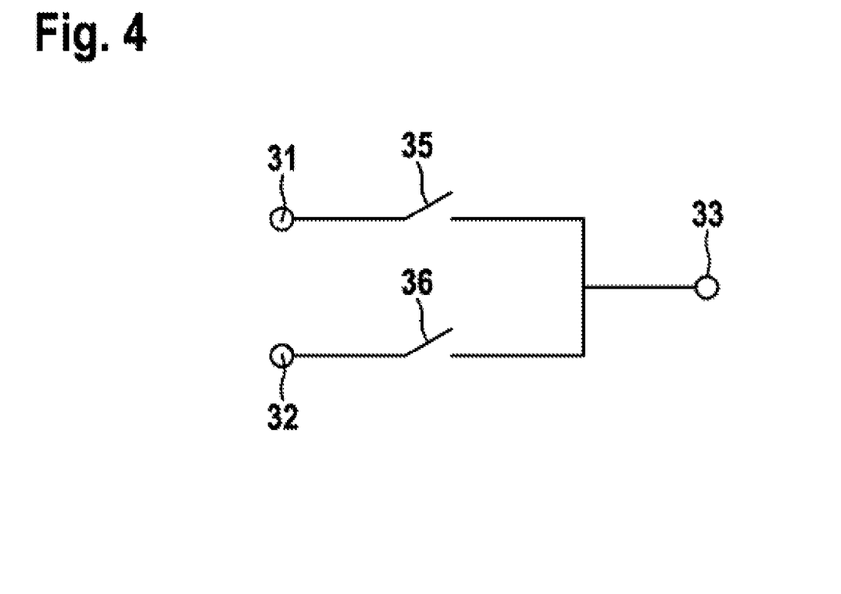
FIG. 4 shows a possible implementation of the first embodiment of the coupling unit with regard to the switching technology.

FIG. 4 illustrates a possible implementation of the first embodiment of the coupling unit 30 with regard to the switching technology, wherein a first and a second switch 35 and 36 respectively are provided. Each of the switches is connected between one of the inputs 31 and 32 respectively and the output 33. This embodiment provides the advantage that it is also possible to disconnect the two inputs 31, 32 from the output 33, so that the output 33 is a high impedance output, which can be useful, for example, in the case of making a repair or carrying out maintenance. In addition, the switches 35, 36 can be embodied simply as semi-conductor switches such as MOSFETs or IGBTs. Semi-conductor switches have the advantage of being favorably priced and providing a high switching speed, so that the coupling unit 30 can react within a comparatively short period of time to a control signal and accordingly to a change of control signal.

Figure 5:
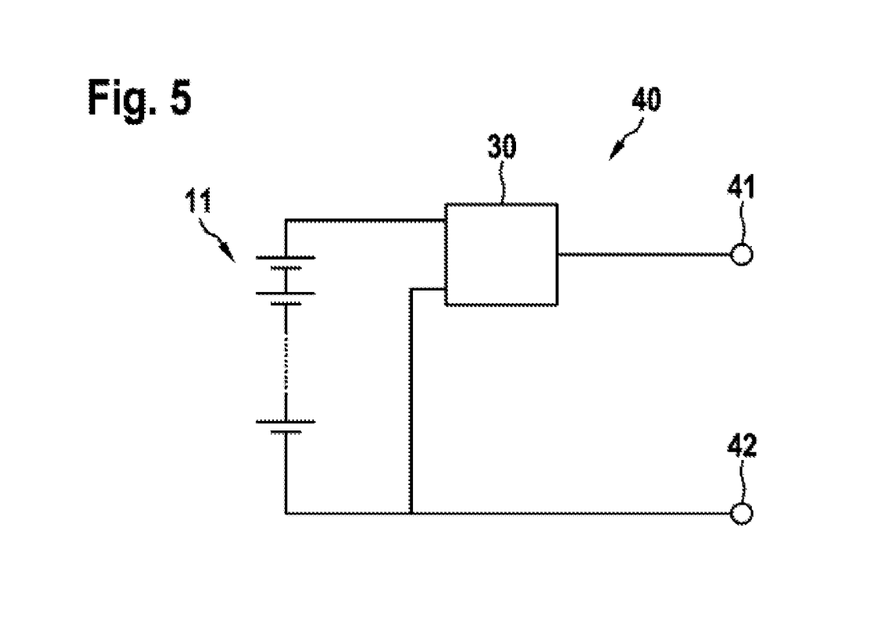
FIGS. 5 and 6 show two embodiments of a battery module having the first embodiment of the coupling unit.
Figure 6:
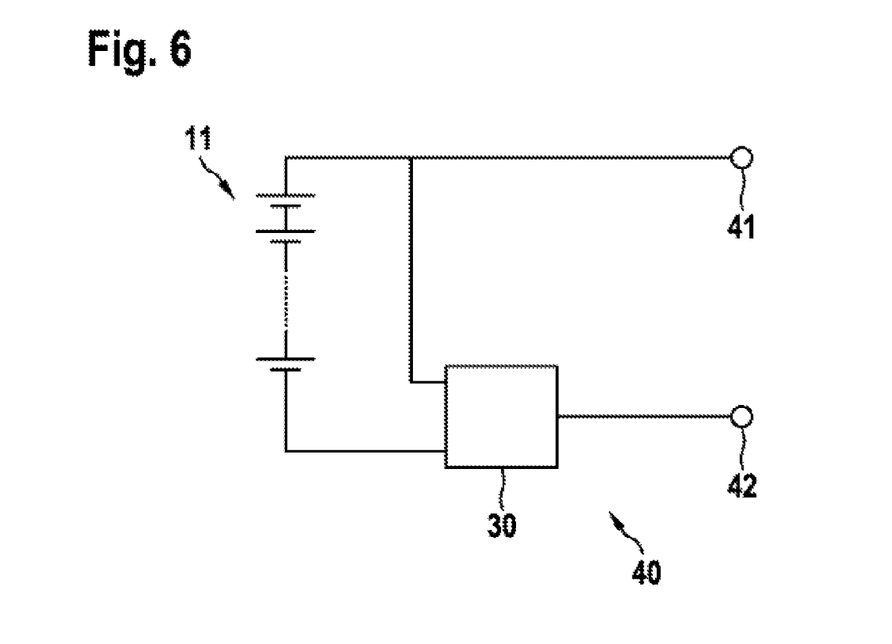

FIGS. 5 and 6 illustrate two embodiments of a battery module 40 having the first embodiment of the coupling unit 30. A plurality of battery cells 11 is connected in series between the inputs of the coupling unit 30. However, the disclosure is not limited to battery cells 11 being connected in series in this manner, it can also provide only one individual battery cell 11 or else a parallel connection or a combination of a series and parallel connection of battery cells 11. In the example illustrated in FIG. 5, the output of the coupling unit 30 is connected to a first terminal 41 and the negative pole of the battery cells 11 is connected to a second terminal 42. However, an almost mirror-inverted arrangement as illustrated in FIG. 6 is possible, wherein the positive pole of the battery cells 11 is connected to the first terminal 41 and the output of the coupling unit 30 is connected to the second terminal 42.

Figure 7:
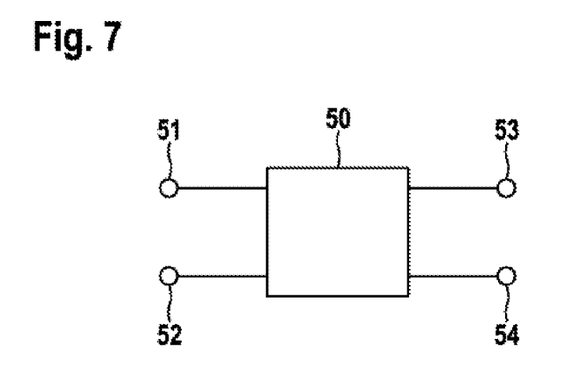
FIG. 7 shows a second embodiment of a coupling unit for use in a battery with which the method in accordance with the disclosure can be performed.

FIG. 7 illustrates a second embodiment of a coupling unit 50 for use in a battery with which the method in accordance with the disclosure can be performed. The coupling unit 50 comprises two inputs 51 and 52 and also two outputs 53 and 54. Said coupling unit is embodied to connect either the first input 51 to the first output 53 and also to connect the second input 52 to the second output 54 (and to disconnect the first output 53 from the second output 54) or else to connect the first output 53 to the second output 54 (and in so doing to disconnect the inputs 51 and 52). In the case of particular embodiments of the coupling unit, said coupling unit can also be embodied to disconnect the two inputs 51, 52 from the outputs 53, 54 and also to disconnect the first output 53 from the second output 54. However, it is not provided that it can also connect the first input 51 to the second input 52.

Figure 8:
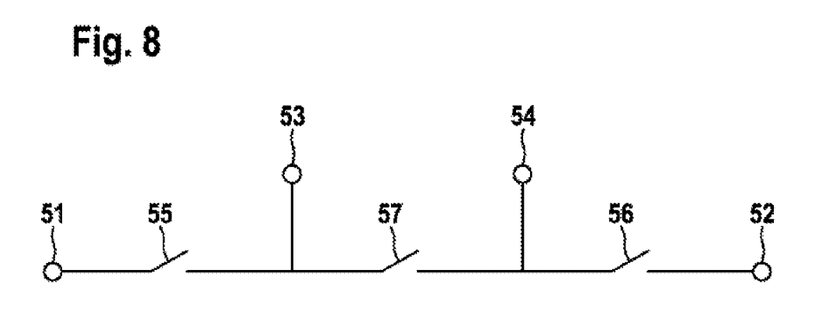
FIG. 8 shows a possible implementation of the second embodiment of the coupling unit with regard to the switching technology.

FIG. 8 illustrates a possible implementation of the second embodiment of the coupling unit 50 with regard to the switching technology, wherein a first, a second and a third switch 55, 56 and 57 are provided. The first switch 55 is connected between the first input 51 and the first output 53; the second switch 56 is connected between the second input 52 and the second output 54 and the third switch 57 is connected between the first output 53 and the second output 54. This embodiment likewise provides the advantage that the switches 55, 56 and 57 can be embodied simply as semi-conductor switches such as MOSFETs or IGBTs. Semi-conductor switches have the advantage of being favorably priced and providing a high switching speed, so that the coupling unit 50 can react within a comparatively short period of time to a control signal and accordingly to a change of control signal.

Figure 9:
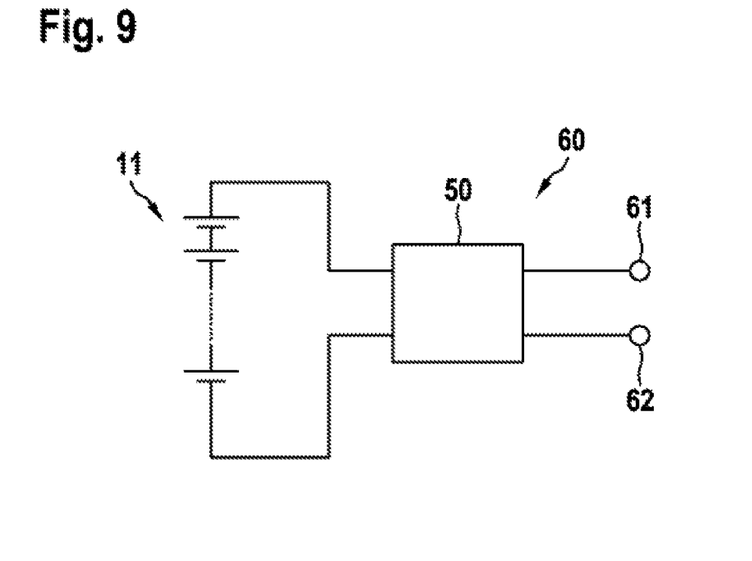
FIG. 9 shows an embodiment of a battery module having the second embodiment of the coupling unit.

FIG. 9 illustrates an embodiment of a battery module 60 having the second embodiment of the coupling unit 50. A plurality of battery cells 11 is connected in series between the inputs of a coupling unit 50. Also this embodiment of the battery module 60 is not limited to battery cells 11 being connected in series in this manner, it can in turn also provide only an individual battery cell 11 or else a parallel connection or a combination of a series and parallel connection of battery cells 11. The first output of the coupling unit 50 is connected to a first terminal 61 and the second output of the coupling unit 40 is connected to a second terminal 62. In comparison to the battery module 40 illustrated in FIGS. 5 and 6, the battery module 60 provides the advantage that the battery cells 11 can be disconnected on both sides from the remaining battery by means of the coupling unit 50, which renders it possible to replace said battery without risk during operation, since the dangerously high total voltage of the remaining battery modules of the battery is not available at any pole of the battery cells 11.

Figure 10:
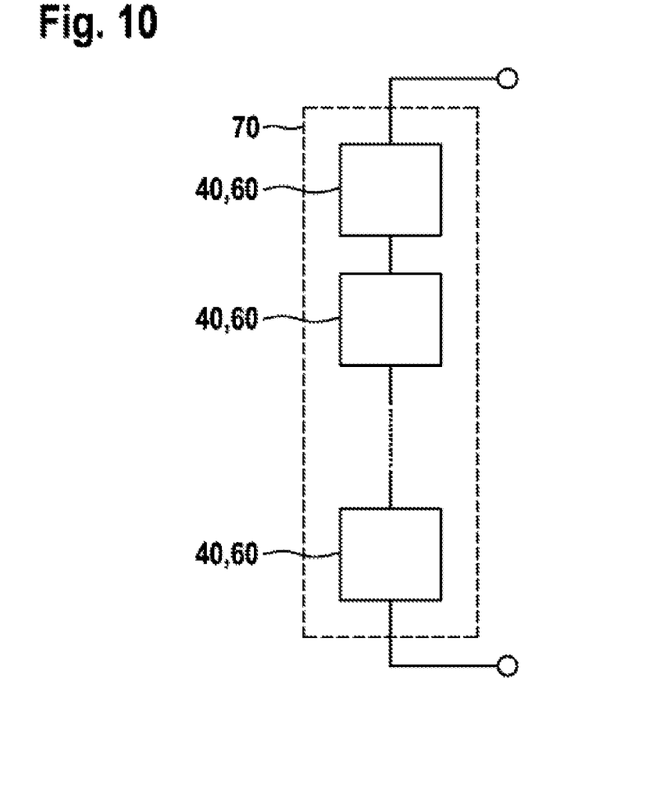
FIG. 10 shows a battery with which the method in accordance with the disclosure can be performed.

FIG. 10 illustrates an embodiment of a battery with which the method in accordance with the disclosure can be performed. The battery comprises a battery module string 70 having a plurality of battery modules 40 or 60, wherein preferably each battery module 40 or 60 comprises the same number of battery cells 11 that are connected in an identical manner. In general, the battery module string 70 can contain any number of battery modules 40 or 60 greater than 1. Also, at the poles of the battery module string 70, charging and disconnecting devices and disconnecting devices can in addition be provided as illustrated in FIG. 2 if this is required by safety regulations. However, disconnecting devices of this type are not required in accordance with the disclosure because the battery cells 11 can be decoupled from the battery terminals by means of the coupling units 30 or 50 that are provided in the battery modules 40 or 60.

Figure 11:
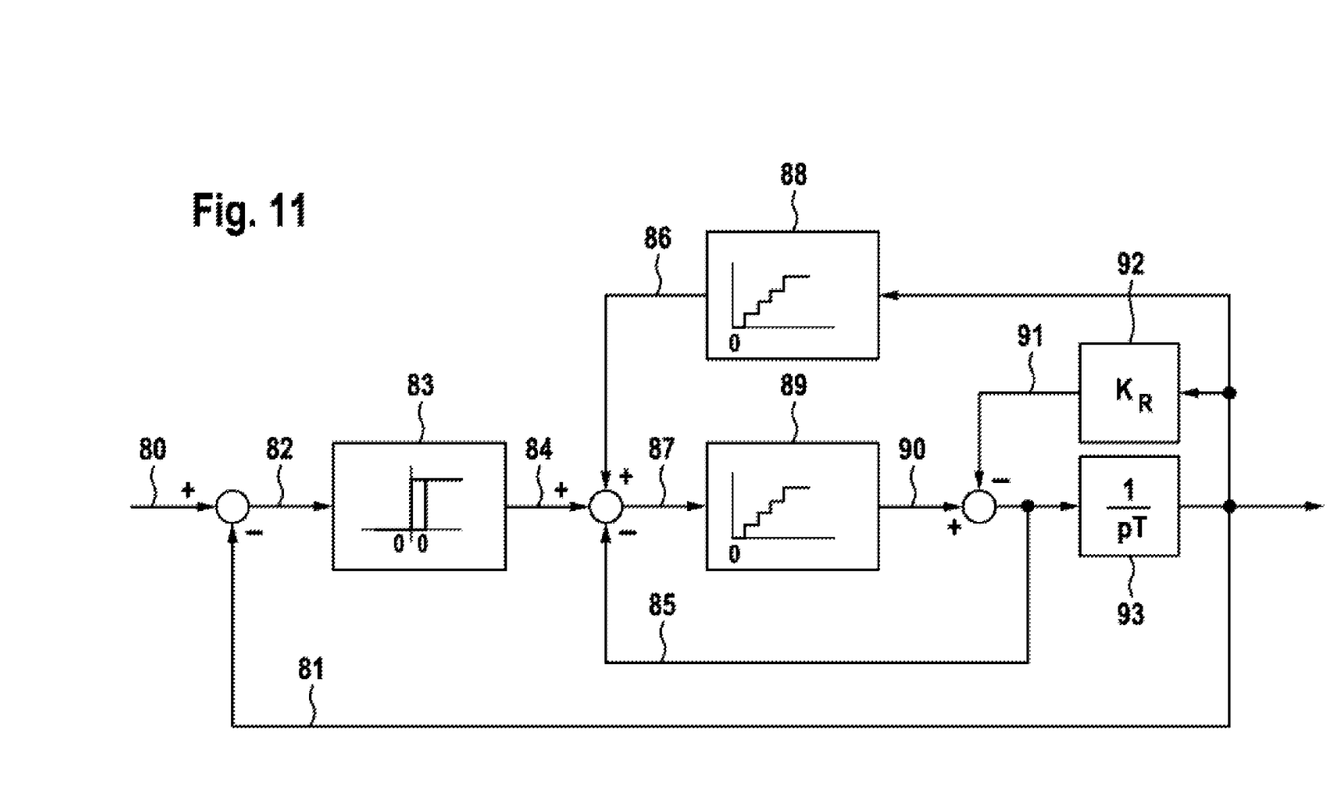
FIG. 11 shows a block diagram of an exemplary closed loop control system in accordance with the disclosure.

FIG. 11 illustrates a block diagram of an exemplary closed loop control system in accordance with the disclosure. The desired value of the voltage of the DC voltage intermediate circuit is compared in a superimposed closed loop control circuit with the instantaneous value of the voltage of the DC voltage intermediate circuit. If the DC voltage intermediate circuit is to be fully charged, in other words, the voltage of the DC voltage intermediate circuit is to be increased, the desired value is set directly to the value of the total voltage of all the series-connected battery modules. Naturally, the desired value can also be set to any other voltage value but in practical applications of the DC voltage intermediate circuit it is usually charged to the maximum value of the output voltage of the battery. The two-stage control of the superimposed closed loop control circuit then uses the desired value of the charging current as a desired value for an underlaying current closed loop control circuit that is implemented as a multipoint controller so that the DC voltage intermediate circuit is charged, for example, with the maximum permissible charging current or a charging current that is below the maximum permissible charging current by a safety margin. The underlaying multipoint closed loop control circuit then adjusts the desired value of the charging current using the battery that functions as a multipoint control element by transmitting corresponding control signals to the coupling units of the battery modules.

In detail, a desired operating voltage for the DC voltage intermediate circuit is stipulated on the input side at the point 80 and said desired operating voltage is compared at the point 81 by means of a subtraction element with an instantaneous operating voltage of the DC voltage intermediate circuit and a voltage difference is generated at the point 82. The voltage difference is subjected to a quantizing operation in a closed loop control element 83 and said quantizing operation implements the desired two-stage closed loop control by converting the voltage difference at the point 82 into a desired charging current at the point 84, which desired charging current can only assume two different values. Optionally, the closed loop control element 83 can also perform a hysteresis function that advantageously reduces the switching frequency of the closed loop control system.

An instantaneous charging current at the point 85 is subtracted in a subsequent subtraction element from the desired charging current at the point 84. In addition, the instantaneous value of the voltage of the DC voltage intermediate circuit is converted in a closed loop control element 88 into a maximum output voltage of the battery that is, however, lower than the instantaneous value of the voltage of the DC voltage intermediate circuit and a value that is derived therefrom is added in the subtraction element, so that an adjusting variable for the current is available at the point 88 and said adjusting variable is converted in a subsequent closed loop control element 89 at the point 90 into a digitized current value for the selection of an output voltage of the battery.

The remaining blocks model the behavior of the DC voltage intermediate circuit. The voltage of the DC voltage intermediate circuit at the point 81 is converted by way of a proportional element 92 with a scalar factor $K_R$ into a current value at the point 91, which current value is subtracted in a further subtraction element from the digitized current value at the point 90 and thus delivers the instantaneous current value at the point 85. The prevailing instantaneous current value can also be determined by means of performing a direct measurement and forming an average over an appropriate period of time and said prevailing instantaneous current value can flow into the closed loop control system at the point 85. The closed loop control element 93 describes the integration characteristic of a capacity, such as is represented at least approximately by the DC voltage intermediate circuit, and converts the current flowing in the DC voltage intermediate circuit into the voltage of the DC voltage intermediate circuit. It also applies here that, in practice, the prevailing voltage of the DC voltage intermediate circuit is usually not calculated but rather is determined by means of performing a measurement.

Alternatively, the closed loop control system can also be implemented as a multipoint control using hysteresis or with minimum dwell duration in the switching states in order to limit the switching frequency of the adjusting element. The change in switching state is preferably performed in a time-discrete manner, i.e. synchronous with a pulse of, for example, 100 kHz, which would result in a maximum switching frequency of 50 kHz.

The disclosure relates to the idea that a battery having a coupling unit for adjusting the output voltage of the battery can be used directly as a multipoint adjusting element for the process of charging the DC voltage intermediate circuit. If, for example, the prevailing charging current is lower than a desired value of the charging current, the greater of the two selected output voltages of the battery is set. If, on the other hand, the prevailing charging current is greater than its desired value, then the lower of the two selected output voltages of the battery is set.

The method in accordance with the disclosure can be achieved using software functions within the scope of the control of the battery without any special additional expenditure. In this case, the different known multipoint methods with their respective advantages and disadvantages are available for integrating the battery as a multipoint adjusting element in a closed loop control circuit. Fundamentally, these methods differ with respect to the maximum occurring switching frequency and with respect to the ripple components that the charging current comprises during the charging process. The closed loop control circuit illustrated in FIG. 11 is only an example for a possible multipoint method.

The disclosure renders it possible to adjust the voltage of a DC voltage intermediate circuit in a controlled manner without using a charging device. As a consequence, the charging device that is provided as standard in a practical application can be omitted, as a result of which costs are saved and the volume and weight of the entire arrangement are reduced.

The invention claimed is:

1. A method for adjusting a voltage of a DC voltage intermediate circuit in a battery system having a battery and a drive system, wherein the battery is connected to the drive system by way of the DC voltage intermediate circuit and comprises a number of n series-connected battery modules, wherein each series-connected battery module comprises a coupling unit and at least one battery cell that is connected between a first input and a second input of the coupling unit and is configured to provide either a battery module voltage or a voltage of zero in dependence upon a switching state of the coupling unit, and wherein n is greater than 1 so that the battery is configured to provide an output voltage that is selectable from n+1 different output voltages, the method comprising:
  a) determining an instantaneous value of the voltage of the DC voltage intermediate circuit;
  b) comparing the instantaneous value of the voltage of the DC voltage intermediate circuit with the different output voltages of the battery;
  c) selecting a first selected output voltage of the battery that is the highest voltage of those output voltages of the battery that are lower than the instantaneous value of the voltage of the DC voltage intermediate circuit;
  d) selecting a second selected output voltage of the battery that is the lowest voltage of those output voltages of the battery that are higher than the instantaneous value of the voltage of the DC voltage intermediate circuit;
  e) providing the first selected output voltage of the battery during a first variable period of time;
  f) providing the second selected output voltage of the battery during a second variable period of time; and
  g) repeating the steps a) to f) until the voltage of the DC voltage intermediate circuit achieves a desired operating voltage.

2. The method as claimed in claim 1, wherein the desired operating voltage is equal to a maximum of the n+1 different output voltages of the battery.

3. The method as claimed in claim 1, wherein the step of determining the instantaneous value of the voltage of the DC voltage intermediate circuit includes measuring the voltage of the DC voltage intermediate circuit.

4. The method as claimed in claim 1, wherein the first variable period of time and the second variable period of time are determined in dependence upon a difference between the desired operating voltage and the instantaneous value of the voltage of the DC voltage intermediate circuit.

5. The method as claimed in claim 1, further comprising: measuring a prevailing charging current.

6. The method as claimed in claim 5, further comprising: comparing the measured prevailing charging current with a maximum permissible charging current,
  wherein at least one of the steps e) and f) are terminated if a magnitude of the prevailing charging current is greater than the maximum permissible charging current.

7. The method as claimed in claim 5, further comprising: determining an average charging current; and
  comparing the average charging current with a desired charging current,
  wherein the first variable period of time is extended and/or the second variable period of time is reduced if the average charging current is greater than the desired charging current, and
  wherein the first variable period of time is reduced and/or the second variable period of time is increased if the average charging current is lower than the desired charging current.

8. The method as claimed in claim 7, wherein the desired charging current is maintained at a constant value until the voltage of the DC voltage intermediate circuit achieves the desired operating voltage.

9. A battery comprising:
  a control unit; and
  a number of n series-connected battery modules, each series-connected battery module comprises a coupling unit and at least one battery cell that is connected between a first input and a second input of the coupling unit, and is configured to provide either a battery module voltage or a voltage of zero in dependence upon a switching state of the coupling unit,
  wherein n is greater than 1 so that the battery is configured to provide an output voltage that is selectable from n+1 different output voltages,
  wherein the control unit is configured to perform a method for adjusting a voltage of a DC voltage intermediate circuit in a battery system,
  wherein the battery system includes the battery and a drive system,
  wherein the battery is connected to the drive system by way of the DC voltage intermediate circuit,
  wherein the method includes
    a) determining an instantaneous value of the voltage of the DC voltage intermediate circuit,
    b) comparing the instantaneous value of the voltage of the DC voltage intermediate circuit with the different output voltages of the battery,
    c) selecting a first selected output voltage of the battery that is the highest voltage of those output voltages of the battery that are lower than the instantaneous value of the voltage of the DC voltage intermediate circuit,
    d) selecting a second selected output voltage of the battery that is the lowest voltage of those output voltages of the battery that are higher than the instantaneous value of the voltage of the DC voltage intermediate circuit,
    e) providing the first selected output voltage of the battery during a first variable period of time,
    f) providing the second selected output voltage of the battery during a second variable period of time, and
    g) repeating the steps a) to f) until the voltage of the DC voltage intermediate circuit achieves a desired operating voltage.

10. A battery system comprising:
  a battery including a control unit, and a number of n series-connected battery modules, each series-connected battery module including a coupling unit and at least one battery cell that is connected between a first input and a second input of the coupling unit, and is configured to provide either a battery module voltage or a voltage of zero in dependence upon a switching state of the coupling unit;
  a DC voltage intermediate circuit that is connected to the battery; and
  a drive system that is connected to the DC voltage intermediate circuit,
  wherein n is greater than 1 so that the battery is configured to provide an output voltage that is selectable from n+1 different output voltages,
  wherein the control unit is configured to perform a method for adjusting a voltage of the DC voltage intermediate circuit,
  wherein the battery is connected to the drive system by way of the DC voltage intermediate circuit,
  wherein the method includes
    a) determining an instantaneous value of the voltage of the DC voltage intermediate circuit,
    b) comparing the instantaneous value of the voltage of the DC voltage intermediate circuit with the different output voltages of the battery,
    c) selecting a first selected output voltage of the battery that is the highest voltage of those output voltages of the battery that are lower than the instantaneous value of the voltage of the DC voltage intermediate circuit, d) selecting a second selected output voltage of the battery that is the lowest voltage of those output voltages of the battery that are higher than the instantaneous value of the voltage of the DC voltage intermediate circuit,
e) providing the first selected output voltage of the battery during a first variable period of time,
f) providing the second selected output voltage of the battery during a second variable period of time, and
g) repeating the steps a) to f) until the voltage of the DC voltage intermediate circuit achieves a desired operating voltage.

11. The battery system as claimed in claim 10, wherein:
the battery system is included in a motor vehicle, and
the drive system of the battery system comprises an electric drive motor configured to drive the motor vehicle and a pulse-controlled inverter.

* * * * *